Dec. 24, 1968     J. G. PETERSEN     3,418,560
SYSTEM FOR SUPPLYING REVERSIBLE ELECTRIC POWER TO REACTIVE LOADS
Filed Aug. 12, 1966     2 Sheets-Sheet 1

WITNESSES
Theodore F. Wrobel
James T. Young

INVENTOR
Joseph G. Petersen
BY Clement J. Paynokas
ATTORNEY

Dec. 24, 1968   J. G. PETERSEN   3,418,560
SYSTEM FOR SUPPLYING REVERSIBLE ELECTRIC POWER TO REACTIVE LOADS
Filed Aug. 12, 1966   2 Sheets-Sheet 2

United States Patent Office 3,418,560
Patented Dec. 24, 1968

3,418,560
SYSTEM FOR SUPPLYING REVERSIBLE ELECTRIC
POWER TO REACTIVE LOADS
Joseph G. Petersen, Buffalo, N.Y., assignor to Westinghouse Electric Corporation, Pittsburgh, Pa., a corporation of Pennsylvania
Filed Aug. 12, 1966, Ser. No. 572,017
18 Claims. (Cl. 321—47)

ABSTRACT OF THE DISCLOSURE

An A.C. energized reversible power supply for a reactive D.C. load. The power supply requires only a relatively small number of controlled switching elements. It has for each direction of current flow a controlled switch in series with the A.C. supply and the load, and a controlled switch across the load to discharge inductive power stored in the load. The two switches for a given power direction are sequentially fired during successive half cycles of A.C. at selected instants to provide average D.C. volts across the load to drive power into the load.

This invention relates to systems for supplying from an A.C. (alternating current) source, reversible D.C. (direct current) electric power to a reactive load, for example, the D.C. field of the generator in a Ward-Leonard adjustable voltage motor drive.

In the usual transformerless bridge type arrangements for converting A.C. to D.C. and reversibly supplying power to a load during both half cycles of the A.C. supply, at least eight active elements such as controlled rectifiers are required. To control such a complement of active elements requires a relatively complicated gating (firing) circuit.

It is an object of the present invention to provide a relatively simple, A.C. energized, reversible output power system having a small number of converting elements for supplying D.C. power in either direction to an inductive load on both half cycles of the A.C. supply.

The objects of the invention may be attained in accordance with one embodiment of the invention wherein an A.C. energized converting system includes, for each direction of current flow, a power path in series with an inductive load, and an inductive energy discharge path connected across the load, the power path being provided with a switching element for example a controlled rectifier which is gated to pass current through the load during every other half cycle, and the discharge path being provided with a switching element for example a controlled rectifier which is gated to discharge the reactive energy of the load during the intervening half cycles, thus providing for current flow through the load on both half cycles of the A.C. supply for either direction of load current flow.

Other and further objects and advantages of the invention will be apparent from the following detailed description taken in connection with the drawings wherein a preferred form of the invention is illustrated. In the drawings.

Figure 1:
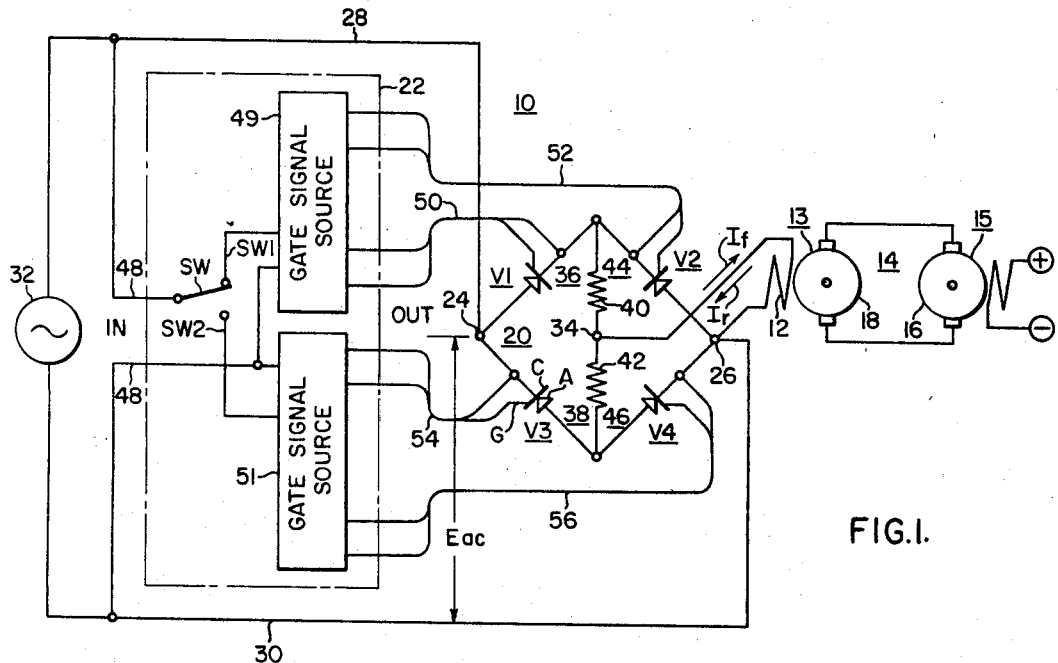
FIGURE 1 is a circuit diagram illustrating the application of the invention to a reversible supply system for the D.C. field of a generator in a Ward-Leonard system.

Referring now to FIG. 1 of the drawing, a reversible power supply source 10 is shown supplying the D.C. field 12 of a generator 13 in a Ward-Leonard motor drive system 14 wherein the armature 16 of a motor 15 is connected in a loop circuit with the armature 18 of generator 13. Since Ward-Leonard systems are well known, the system 14 is shown in elemental symbolic form.

The power suppply system 10 includes a converting network 20 and a firing control circuit 22 for controlling the conduction times of a plurality of controlled switching devices V1, V2, V3 and V4 in the converting network 20, in accordance with the desired direction and value of the power output of the converting network 20.

Preferably the switching devices V are of a type that may be abruptly rendered highly conducting (assume a low impedance state) in response to a control signal applied thereto, and that will discontinue conduction when an associated electrical quantity (depending on the type of device), for example current therethrough, drops below a holding or sustaining value. Some examples of such switching devices are controlled rectifiers of the solid state type, or tube type, or other. A popular form of solid state type controlled rectifier is known as a "thyristor." An example of tube type controlled rectifier is the well known "thyratron." Thus, although controlled switching devices V (V1, V2, V3 and V4) are shown as thyristors, other controlled rectifiers, for example, thyratrons, may be employed with suitable adaptations. Each device V is provided with a main current inlet electrode A, a main current outlet electrode C, an internal main or power current path extending from the main current inlet electrode to the main current outlet electrode, and a control electrode G for controlling the current flow through the main current path. In thyristors and thyratrons the electrodes, A, C and G are referred to as anode, cathode and gate electrodes, respectively, and the main current path is known as the anode-cathode path.

The converting network 20 has an A.C. input circuit, including terminals 24 and 26, through which A.C. is supplied to the network. These terminals are shown connected through input lines 28 and 30 across an A.C. source 32.

The D.C. output circuit of converter 20 includes a terminal 34, terminal 26 and an inductive load (example generator field 12) connected across the terminals 34 and 26. Since terminal 26 is common to both the input and output circuits, it may be referred to as an input-output terminal.

The converting network 20 includes two power courses 36 and 38 energized from the A.C. input circuit, one for each direction of load current, and each including the load 12 and the main current path of a different thyristor V.

Power course 36, extending from input terminal 24 to input-output terminal 26, includes in series the main current path of thyristor V1, an impedance 40 (example resistor) output terminal 34, and the load 12. Power course 38, also extending between terminals 24 and 26, includes the main current path of thyristor V3 oppositely poled relative to thyristor V1, an impedance 42 (example resistor), terminal 34 and the load 12. From the above, it is seen that thyristors V1 and V3, provide parallel but oppositely poled switching paths connected between terminals 24 and 34, thus forming a circuit configuration wherein the load 12 is in series with a pair of parallel connected but oppositely poled controllable asymmetric switching paths.

The converting network 20 is also provided with a pair of parallel but oppositely poled discharge paths 44 and 46 connected across the output terminals 34 and 26 for abruptly discharging at selected times reactive energy stored in the load. Discharge path 44 includes in series thyristor V2 and impedance 40, while discharge path 46 includes in series thyristor V4 and impedance 42. Thyristors V2 and V4 are oppositely poled, thereby providing parallel but oppositely poled controlled asymmetric switching paths connected across the output terminals 34 and 26. It may be noted at this time that with respect o suiable reference points such as the input terminals 24 and 26, thyristors V1 and V3 are oppositely poled, thyristors V2 and V4 are oppositely poled, trristors V1 and V2 are series opposed, tryristors V3 and V4 are series opposed, thyristors V1 and V4 are poled alike, and thyristors V2 and V3 are poled alike.

To supply load current in either direction as desired and of any desired magnitude, a firing circuit 22 supplies firing signals in predetermined sequence to thyristors V1 and V2 or to thyristors V3 and V4, the particular pair operated, V1–V2 or V3–V4, being dependent upon the direction of current flow desired.

That half cycle of the supply A.C. during which forward voltage is applied to the anode of any thyristor V shall be referred to as the "operative" half cycle of that thyristor. It follows that if a proper control signal is applied to the gate of a thyristor at any instant during its operative half cycle, the thyristor will fire (be rendered conducting) and conduct until the current therethrough falls below the holding value. For convenience thyristors V1 and V3 shall be referred to as the power thyristors, while tryristors V2 and V4 shall be referred to as the discharge thyristors.

Various protective devices and networks normally employed in connection with thyristors to protect them against surges, reverse voltages, etc., are well known in the art, and are not shown herein in order to avoid complicating the disclosure.

As will be more fully hereinafter described, one pair of thyristors V (including a power thyristor and a discharge thyristor) operates to provide load current flow in one direction, while the other pair of thyristors operates to provide current flow in the opposite direction through the load. These pairs of thyristors are referred so as "control pairs." The control pair for the direction of load current indicated by the arrow $I_f$ consists of thyristors V1 and V2. For the opposite direction of load current indicated by the arrow $I_r$, the control pair consists of thyristors V3 and V4.

For convenience the A.C. supply wave $Eac$ applied to the input terminal 24 of the connecting network 20 will be employed as a time reference. This wave is shown at (a) in FIG. 2. The positive halves X of wave $Eac$ apply forward voltage to the anode A of thyristor V1, and the negative halves Y of this wave being negative at the cathode C of thyristor V3 apply forward voltage to the anode A of this thyristor. Thus the half cycles X are the operative half cycles of thyristor V1, while half cycles Y are the operative half cycles of thyristor V3.

Assume that the value of inductance in the load is very high. Also assume that all the thyristors V are ungated (not conducting). If a gate signal (firing pulse) is applied to thyristor V1 at any time during the half cycle X, this thyristor will fire (be rendered conducting) and load current will flow in the direction $I_f$, and since the load is highly inductive, the current will continue to flow even when the wave $Eac$ reverses at 180°. However at 180° the voltage due to reactive energy stored in the inductive load will be of a polarity to apply forward voltage to the anode of thyristor V2 and this thyristor could be fired if a gating signal were applied thereto. Thus in point of time, the half cycles Y are the operative half cycles of thyristor V2. With thyristor V1 fired at some instant (angle) during the X half cycle, and with thyristor V2 ungated during the Y half cycle, the average D.C. voltage (assume this is a positive polarity) across the load for forward load current $I_f$ will be of a relatively low value and result in very low forward average power depending on the amount of inductance in the load circuit. However if thyristor V2 is fired at some instant during that portion of its operative half cycle (the Y half cycle) when the time integral of the reactive voltage across the load is less than that of the line voltage across the load, the reactive reverse voltage across the load will be chopped off and the average positive D.C. voltage across the load will be increased to increase the forward load current $If$ and the average power into the load. For a given firing angle of thyristor V1, the sooner that thyristor V2 is fired during its operative half cycle, the greater will be the average positive D.C. voltage across the load and the greater will be the average power into the load in the direction $I_f$. If the power path is arranged to have less inductance, reactive voltage will exist over less time into the Y half cycle, and the gate signal on thyristor V2 must be applied earlier, i.e., advanced further in the direction from 360° toward 180° of the wave $Eac$, to have a control effect.

For supplying power into the load in the reverse direction (arrow $I_r$), thyristors V1 and V2 are ungated while thyristors V3 and V4 are gated in the aforedescribed manner except that the operative half cycles of thyristors V3 and V4 are respectively half cycles Y and half cycles X.

It should be noted that if power is flowing into the load in a particular direction say $I_f$ as a result of the gating of a particular control pair of thyristors, power flow in that direction can be quickly reduced by firing the thyristors of the active control pair in such manner that the time integral of the reactive voltage across the load is greater than the time integral of the supply voltage across the load. This produces an average D.C. voltage across the load of a polarity to oppose and quickly reduce the flow of power into the load.

The thyristors V of the converting network 20 are controlled by any suitable firing circuit 22 having first and second modes of operation which will selectively operate the thyristors in accordance with first and second alternative control patterns as follows:

Under one control pattern thyristors V3 and V4 are ungated and thyristors V1 and V2 are alternately turned ON during their respective operative half cycles at such instants that will produce across load 12 an average D.C. voltage of desired polarity. Average D.C. voltage of one polarity, for example positive, will provide average power into the load in the direction of arrow $I_f$ while average voltage of opposite polarity (in this case negative) will oppose the $I_f$ direction of power into the load. In response to the other control pattern, thyristors V1 and V2 are ungated while thyristors V3 and V4 are alternately turned ON during their respective operative half cycles at such instants that will provide across load 12 an average D.C. voltage of desired polarity. Negative polarity will supply average power into the load in the opposite direction as indicated by arrow $I_r$.

It may be noted that for thyristors V1 and V2 to provide average D.C. voltage of positive polarity across load 12, thyristors V1 and V2 are sequentially fired on alternate half cycles at such times as to make the voltage-time interval of the supply voltage across the load greater than the voltage-time integral of reactive voltage across the load. On the other hand, for thyristors V1 and V2 to provide average D.C. voltage of negative polarity across load 12, thyristors V1 and V2 are sequentially fired on alternate half cycles at such times as to make the voltage-time integral of the reactive voltage across the load greater than the voltage-time integral of the supply voltage across the load. To provide an average D.C. voltage across the load of negative polarity with thyristors V3 and V4, these thyristors are sequentially fired at such times as to make the supply voltage-time integral across the load greater than the reactive voltage-time integral across the load. For thyristors V3 and V4 to provide a positive average D.C. voltage across the load, they are sequentially fired at such times that the reactive voltage-time integral across the load will be greater than the supply voltage-time integral across the load. It should be realized that the supply voltage-time integral across the load occurs during the operative half cycle of the power thyristor of the active control pair. On the other hand the reactive voltage-time integral across the load occurs during the succeeding half cycle which of course is operative half cycle of the discharge thyristor of that control pair.

The example of control circuit 22 in FIG. 1 includes gating signal sources 49 and 51 whose respective power inputs are connectible in the alternative to the supply lines 28–30 through a switch SW and power input lines 48. Being powered by the supply voltage, the supply voltage provides a reference phase against which the outputs of sources 49 and 51 may be compared or related. Source 49 supplies output signals through cables 50 and 52 to sequentially fire the thyristors V1 and V2 at such instants as to provide an average D.C. voltage of desired polarity across the load 12. Source 51 supplies output signals through cables 54 and 56 to sequentially fire thyristors V3 and V4 at such instants as to provide an average D.C. voltage of desired polarity across the load 12. Each of the cables 50, 52, 54 and 56 includes separate gate and cathode lines as shown. Each of sources 49 and 51 may be adjustable to adjust the phase of its output signals relative to the line voltage to selectively provide across the load 12 an adjustable average D.C. voltage of either polarity. If desired, the sources 49 and 51 may be arranged so that source 49 supplies the requisite gating signals to thyristors V1 and V2 to provide across load 12 an average D.C. voltage only of positive polarity to supply average power into the load in the direction of arrow $I_f$, and source 51 applies the requisite gating signals to thyristors V3 and V4 to provide across load 12 an average D.C. voltage of only negative polarity to supply average power into the load in the direction of arrow $I_r$.

One or the other of sources 49 and 51 is selectively activated at any given time by means of a selection or transfer switch SW, which in one position applies power from the A.C. source 32 through a switch contact SW1 to the power input of source 49, and in a second position supplies power through a switch contact SW2 to the power input of source 51.

In one example, the firing circuit 22 may be arranged to supply gating signals to the control pair of thyristors for a particular load current direction in such manner that a gating signal is applied to the power thyristor of that control pair at any selected angle (which may be varied) during the operative half cycle of the power thyristor, and a gating signal is suppled to the discharge thyristor of that control pair in such manner that the signal is always present at the beginning of the operative half cycle of that discharge thyristor. Thus to provide variable load output in a particular direction, the firing signal to the power thyristor of that control pair may be applied at any selected instant between 0° to 180° of a cycle of the supply A.C., while the firing signal to the discharge thyristor of that control pair is applied to be present at 180° (at the 180° instant of the A.C. cycle). To be present at 180°, the control signal to the discharge thyristor of the control pair may be supplied to that thyristor at or before 180°. For example, a firing signal of 180° duration may be supplied to the discharge thyristor of a control pair simultaneously with and track with the firing signal supplied to the power thyristor of that control pair. In such case, the firing angle (instant of firing) of the power thyristor is adjustable between 0° and 180°, while the discharge thyristor of that control pair will always fire at 180°. Maximum load output is achieved when the firing angle of the power thyristor is at 0°, and the output is decreased as the firing angle of the power thyristor is retarded toward 180°, reaching zero output at 180°. It may be noted generally that while power is supplied by the A.C. source during the operative half cycle of the power thyristor of the then operating control pair, over the conduction time of the power thyristor during its operative half cycle, load current is circulated by discharge of reactive power during the next half cycle as a result of the firing of the discharge thyristor of that control pair. Thus, power is supplied to the load on opposite half cycles, that is, full wave power is achieved.

Control of the power into the load also may be effected by adjusting the firing angle of the discharge thyristor while maintaining a fixed firing angle for the power thyristor of a control pair.

The following is another example of control patterns which will successively fire the respective power and discharge thyristors of a control pair to produce across the load an average D.C. voltage of particular polarity for average power into the load of particular direction. For this example, the firing circuit 22 of FIG. 1 is arranged to apply firing signals to the power and discharge thyristors of a control pair 180° apart, that is, the firing signal to the discharge thyristor is applied 180° after the firing signal is applied to the power thyristor. Full average power into the load is provided when the power thyristor of the activated control pair is fired at 0° of the supply wave $Eac$, and is reduced as the firing angle of the power thyristor is retarded (increased) toward 180°. On the other hand, average power into the load is increased as the firing angle of the power thyristor of the control pair is advanced (decreased) from 180° toward 0°. An effective practical range from maximum output to a substantially low minimum output is between 0° to 90°, the high output end being at 0° and the low output at 90°. For example, for load current in the direction of arrow $I_f$, thyristors V3 and V4 are ungated, while thyristor V1 is fired between 0° and 90° of the A.C. supply wave shown in FIG. 2, and thyristor V2 is fired during the succeeding one half cycle at an instant 180° later. For instance, if thyristor V1 is fired at 60° of the supply cycle, (FIG. 2), then thyristor V2 is fired in the succeeding one half cycle at 240°.

It should be appreciated that where the control circuit 22 is arranged to provide a fixed spacing between the gating signals applied to the power and the discharge thyristors of a control pair, the spacing need not be confined to 180°. The fixed spacing may be such that the firing signal to the discharge thyristor lags the firing signal to the power thyristor by a fixed angle which may be more or less than 180°. The particular arrangement employed will depend on the control characteristic desired. Thus while the angle of the gating signal to the power thyristor is varied, the gating signal to the discharge thyristor will track that of the power thyristor by whatever fixed angle the apparatus is designed for.

It should be noted that in all the firing schemes mentioned herein, the power thyristor of the activated control pair is fired while forward voltage is applied to its anode by the A.C. supply voltage, and the discharge thyristor is fired on the succeeding half cycle while forward voltage is applied to its anode by voltage due to the stored reactive energy in the load. On one half cycle forward voltage is applied to the anode of the power thyristor by the A.C. supply, while on the succeeding half cycle forward voltage is applied to the discharge thyristor by voltage produced by the reactive energy stored in the load 12. Thus, it can be seen that for any particular firing angle of the power thyristor, the sooner that the discharge thyristor is fired during its operative half cycle, the higher will be the average output power into the load in the direction dictated by this control pair of thyristors.

Figure 3:
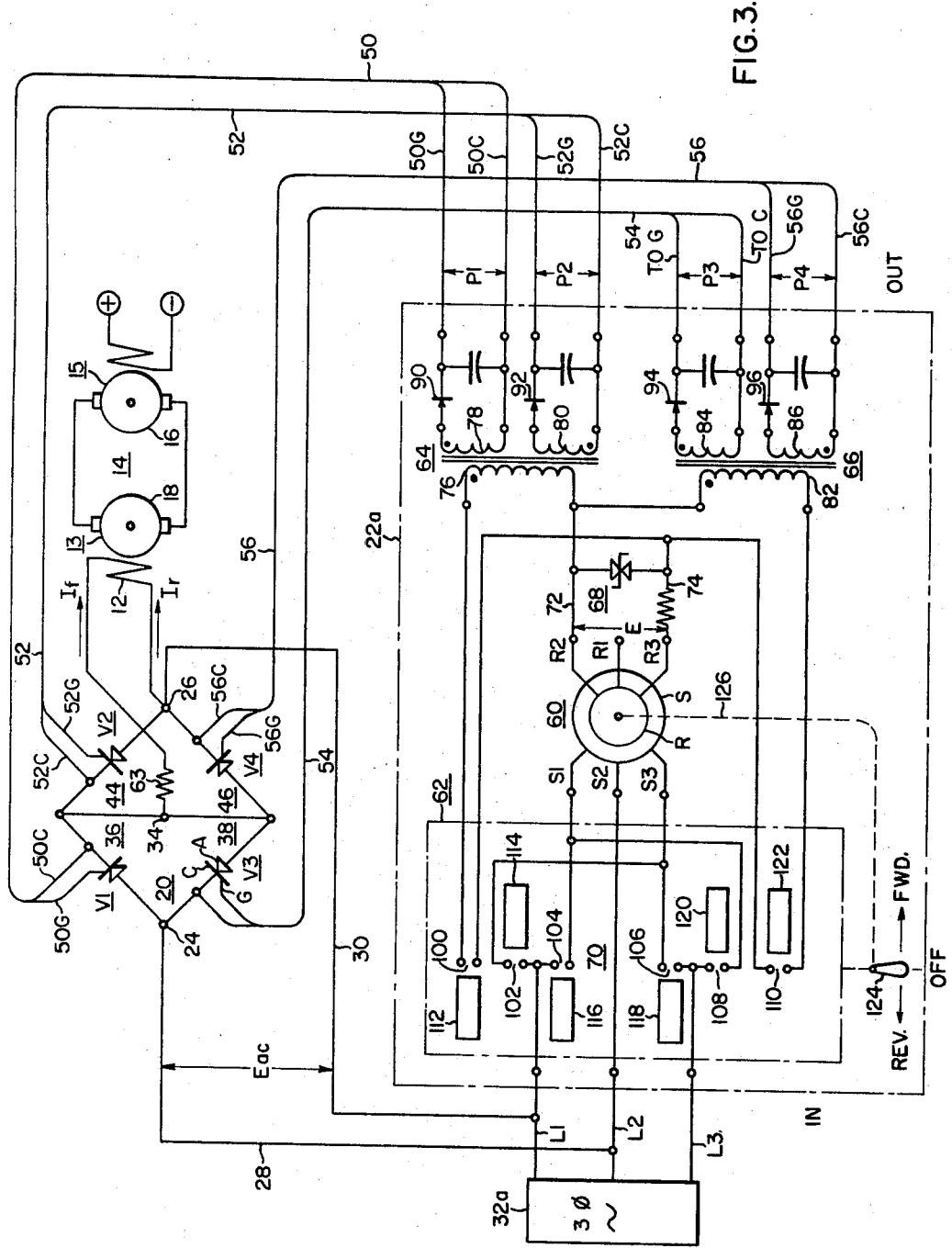
FIG. 3 is a diagram illustrating a specific example of the general system in FIG. 1.

In FIG. 3 there is shown the general system of FIG. 1, but with firing circuit 22a being specific to an example wherein the power thyristor and the discharge thyristor of any activated control pair are alternately fired during successive half cycles of the A.C. supply wave at firing instants (angles) 180° apart, that is the power thyristor being fired at an instant during its operative half cycle while the discharge thyristor is fired during the succeeding half cycle 180° later.

By way of exemplary variation, the resistors 40 and 42 are omitted in FIG. 3, and the A.C. source 32a is shown as a 3-phase source with one phase supplying power to the converter network 20 over lines 28 and 30. The 3-phase output of source 32a is supplied along phase lines L1, L2 and L3. Although a resistor 63 is shown in the load circuit, it may be omitted if desired.

The control circuit 22a includes an adjustable phase shifting transformer 60, a master control transfer switch 62, transformers 64 and 66 which are alternatively coupled to the output of transformer 60 by means of the transfer switch 62, and a clipping arrangement 68 for clipping the output of transformer 60. Transformer 60, in response to input A.C. related to the A.C. supplied to the converting network 20, produces an A.C. output voltage whose phase is shiftable relative to the A.C. supplied to the converting network 20. The phase adjustability of transformer 60 may be by relative movement between transformer elements for example primary and secondary core sections. Convenient relative movement may be effected in a rotary transformer configuration wherein one of the primary or secondary sections is the stator while the other is the rotor.

An effective example of a rotary transformer as shown at 60 is a synchro (selsyn) differential with its three phase input (stator S) connected to the three phase source 32a through a reversing arrangement 70 in master switch 62. Usually the stator winding in a synchro differential is a Y-winding with the free ends of the Y connected to the terminals S1, S2 and S3 of the stator S. In the same manner, the rotor winding is a Y-winding with the free legs of the Y coming out at the terminals R1, R2 and R3 of the rotor R. Only two legs of the rotor Y-winding are used with rotor terminals R2 and R3 connected to output lines 72 and 74. The clipper arrangement 68, which may for example be two Zener diodes in series opposition across lines 72 and 74, clips the output of the transformer 60 to provide a flat top alternating wave with relatively steep wave fronts.

Transformer 64 is provided with a primary (input) winding 76 and secondary (output) windings 78 and 80. Likewise transformer 66 is provided with a primary winding 82 and secondary windings 84 and 86. In combination with the Zener-clipped input, transformers 64 and 66 produce output pulses with steep wave fronts. Similar output pulses may be produced without the clipper 68 by employing saturating transformers at 64 and 66. As will be described hereinafter, the output of the rotary transformer 60 along lines 72 and 74 may be selectively applied to one or the other of the input windings 76 and 82 by manipulating the switch 62.

Output winding 78 is connected through a diode 90 and cable 50 (lines 50G–50C) across the gate and cathode of thyristor V1. Output winding 80 is connected through a diode 92 and cable 52 (lines 52G–52C) across the gate and cathode of thyristor V2. Output winding 84 is connected through a diode 94 and cable 54 to the gate-cathode circuit of thyristor V3. Output winding 86 is connected through a diode 96 and cable 56 to the gate-cathode circuit of thyristor V4. As indicated by the dot convention, windings 78 and 80 supply firing signals to thyristors V1 and V2 180° apart. Also windings 84 and 86 supply firing signals to thyristors V3 and V4, respectively, 180° apart. Thus, when transformer 64 is energized thyristors V1 and V2 are alternately fired 180° apart, and when transformer 66 is energized, thyristors V3 and V4 are alternately fired 180° apart.

Output line L2 of source 32a is connected directly to terminal S2 of the input winding (stator) of the rotary transformer 60. Lines L1 and L3 of source 32 are connected to input terminals S1 and S3 of transformer 60 in one mode of master switch 62, and to terminals S3 and S1 respectively in another operational mode of switch 62.

Master switch 62 is symbolically shown as a drum switch having a plurality of stationary sets of contacts 100, 102, 104, 106, 108 and 110, and a rotatable drum carrying contact segments 112, 114, 116, 118, 120 and 122. The drum is manually rotatable by a handle 124 keyed thereto. Handle 124 is also connected through a coupling 126 to the rotor R of transformer 60 to rotate the rotor of the transformer in unison with rotation of the switch drum.

In the drawing, switch 62 is shown in the OFF position wherein each of the respective contact sets 100 to 110 are unbridged (open circuit position). As seen in the drawing, handle 124 must be moved to the right to move it from 0 position into the FWD range. Moving of handle 124 to the right into the forward (FWD), range moves contact segments 112, 116 and 118 to the right into registry with contact sets 100, 104, 106, respectively, to bridge these contact sets. As a result, lines L1 and L3 are connected to terminals S1 and S3 respectively and the rotor output lines 72 and 74 of transformer 60 are connected across the primary 76 of transformer 64. On the other hand, if switch handle 124 is moved leftward into the reverse (REV) range, contact segments 114, 120 and 122 are moved to the left into registry with contact sets 102, 108 and 110, respectively, thus to connect lines L1 and L3 to transformer stator input terminals S3 and S1, respectively, and the rotor output lines 72 and 74 to the primary 82 of transformer 66. It is assumed that rotor R is moved clockwise in response to rightward movement of handle 124, and counterclockwise with leftward movement of the handle.

The arc or length of the FWD zone or range of switch 62 is the length or arc of any forward contact segment (112, 116 and 118), while the extent of the REV zone is the length of any reverse contact segment (114, 120 and 122). The "dead" zone between the forward and reverse zones of switch 62 is the OFF zone. The low output ends of the FWD and REV ranges adjoin opposite sides of the OFF zone, while the high or full output ends of the FWD and REV zones are their ends furthest removed from the OFF zone.

For a reversible load output of converter 20 over a range extending from maximum to some arbitrary minimum, the control circuit 22 in FIG. 3 may be arranged as follows. For convenience the A.C. supply wave at the converter input terminal 24 will be used as a time or angle reference in discussing the various firing instants (angles) of the thyristors in the network 20. As is well known, the firing or gating angle is the instant at which the controlled switch is fired (abruptly rendered conducting). Conduction angle is the duration of conduction. It should also be noted that "increasing the firing angle" is synonymous with "retarding the firing angle," and "decreasing the firing angle" is synonymous with "advancing the firing angle."

Transformer 60 is so arranged that when lines L1 and L3 are connected to terminals S1 and S3, and starting with a rotor R position wherein the transformer 60 output E, on lines 72 and 74 phase lags the supply wave E$ac$, clockwise movement of the rotor R will decrease the angle by which E, lags E$ac$, and counterclockwise rotor movement will increase this angle. Reversal of the connection between lines (L1, L3 and terminals S1, S3) will reverse the above outlined phase control. More specifically with L1 connected to S3, and L3 connected to S1, clockwise movement of rotor R will increase the lag of E, behind E$ac$, while counterclockwise rotor movement will decrease lag of E, behind E$ac$.

Figure 2:
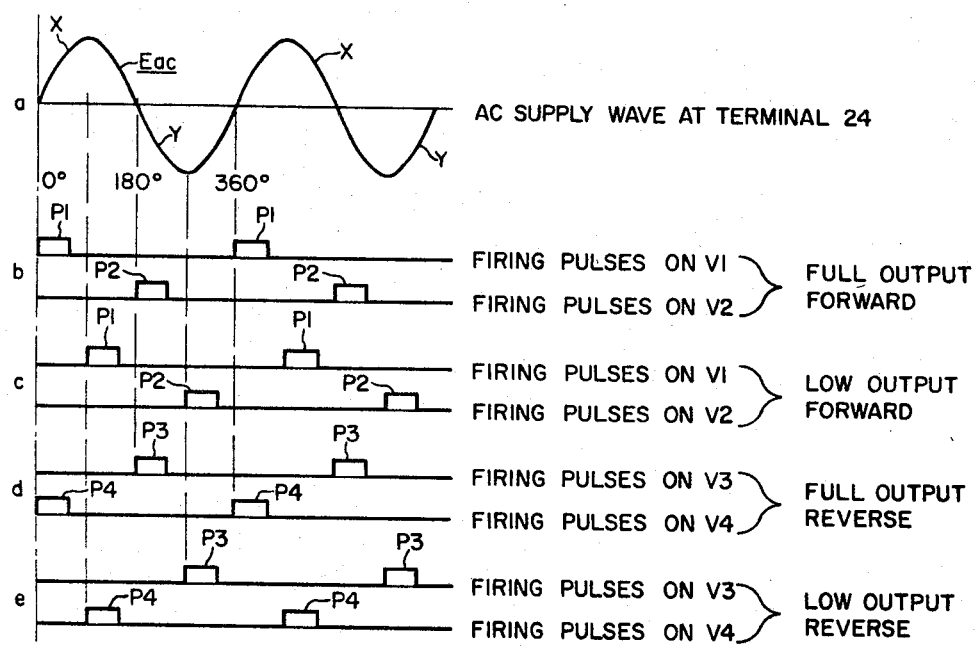
FIG. 2 is a chart showing a waveform illustrating the operation of the circuit in FIG. 1.

The connection between the rotor of transformer 60 and the master switch 62 is so arranged that when the master switch 62 is in the full forward position (thyristors V1 and V2 gated and thyristors V3 and V4 ungated), the firing pulses P1 supplied along cable 50 to thyristor V1 are in phase with the positive halves of the A.C. supply wave E$ac$ as indicated at (b) in FIG. 2. Thus pulses P1 occur at 0° of the A.C. wave E$ac$, and since the positive half X of this wave is the operative half cycle of thyristor V1, this thyristor will be fired at 0° of the wave E$ac$. Since pulses P2 supplied to thyristor V2 via cable 52 are 180° behind pulses P1, pulses P2 occur at 180° of the wave E$ac$ as seen at (b) in FIG. 2. For this position the firing angle of thyristor V1 is 0° while the firing angle of thyristor V2 is 180° (equivalent to 0° of the Y half cycle). This provides full output into the load in the forward direction. To reduce the output, handle 124 is moved to the left. As the handle 124 is moved leftward from full forward position toward the OFF position, the transformer rotor R rotates counterclockwise to retard the firing pulses, i.e., move pulse P1 in a direction from 0° toward 90°, while P2 is moved from 180° toward 270°. As the firing pulses P1 and P2 are retarded, power into the load is reduced. In the example, the low output end of the forward range corresponds with a rotor R position which places pulse P1 at 90° and pulse P2 at 270° of the wave E$ac$. Upon continued leftward movement of the handle 124, switch 62 passes from the low end of the FWD zone into the OFF zone wherein all contact sets 100–110 are unbridged and both transformers 64 and 66 are unenergized. In the OFF zone there are no control pulses delivered to any thyristor V.

Continued leftward movement of handle 64 brings the switch 62 to the low end of the REV range by bridging contact sets 102, 108 and 110, with the left ends of contact segments 114, 120 and 122. With switch 62 in the REV zone, thyristors V3 and V4 are gated, while thyristors V1 and V2 are ungated. Firing pulses P3 are delivered to thyristor V3 via cable 54, while firing pulses P4 are delivered to thyristor V4 through cable 56. Pulses P3 and P4 are 180° apart. The relationship for the low output end of the REV range is shown at (e) in FIG. 2. P3 is at 270° of the supply wave E$ac$ which is equivalent to 90° of half cycle Y, the operative half cycle of thyristor V3. P4 is at 90° of the supply wave E$ac$, which is equivalent to 90° of the half cycle X, the operative half cycle of thyristor V4.

To increase the output in the REV range, handle 124 is moved leftward to rotate the rotor R counterclockwise, thereby to advance pulses P3 and P4 relative to the supply wave E$ac$ and thus advance the firing angles of thyristors V3 and V4. The relationship for full output in the REV range is shown at (d) in FIG. 2 wherein pulse P3 is at 180° of supply wave E$ac$ or 0° of the operative half cycle Y of thyristor V3, and pulse P4 is at 360° of the wave E$ac$ or 0° of the operative half cycle X of thyristor V4.

It should be noted that the example, wherein switch 62 transfers between OFF and either of REV or FWD ranges at about the 90° instant of the operative half cycle of the power thyristor involved, is an arbitrary choice and this angle may be changed as desired in either direction. For example instead of at 90°, the transition from the low end of the FWD range to the OFF zone may be made at a later angle in the operative half cycle of thyristor V1, such as 110° or more. It may be noted that when the firing angles are so late that the reactive voltage-time integral across the load is greater than the supply wave voltage-time integral across the load, the result will be power which will oppose current flow in the forward direction of the power thyristor V of the active control pair.

Resistors 40 and 42 in FIG. 1 speed up the field discharge in the forward and reverse directions respectively. During fast plugging while say thyristor V2 is discharging the field, thyristor V3 can be gated, and under these conditions, resistor 40 plus resistor 42 act as a current limit while the field 12 is being reversed. If fast plugging or reversing is not required, resistors 40 and 42 may be omitted if desired.

In FIG. 3, resistor 63 operates to speed up discharge of the field 12 in either direction. If fast plugging is required, a suitable resistor may be inserted in the line 30. Resistor 63 of FIG. 3 may be omitted if desired, especially where the speed of field discharge is unimportant. It should be understood that regarding the use of resistors 40–42 (FIG. 1) and 63 (FIG. 3), either configuration may be employed in either FIG. 1 or FIG. 3.

From the description herein it will be appreciated that in all the examples of firing patterns described herein, the power and discharge thyristor within each control pair are alternately fired on successive half cycles of the A.C. supply wave. More specifically, where opposite half cycles of the A.C. supply wave are arbitrarily designated as X and Y respectively, for one direction of load current thyristor V1 is fired during the X half cycles and thyristor V2 is fired during the intervening or Y half cycles, and for the opposite direction of load current, thyristor V3 is fired during the Y half cycles, and thyristor V4 is fired during the X half cycles. Regardless where the thyristors of a control pair fire in their respective operative half cycles, it is a valid statement to say that the power thyristor and the discharge thyristor of a control pair are alternately fired during successive half cycles.

From the description herein, it is apparent that the invention provides a relatively simple A.C. energized reversible output D.C. power supply system for inductive loads having a minimum number of active switching elements.

It is to be understood that the herein described arrangements are simply illustrative of the principles of the invention and that other embodiments and applications are within the spirit and scope of the invention.

I claim as my invention:

1. Converting apparatus for supplying from an A.C. source reversible D.C. to a reactive load, said apparatus comprising a power input circuit including first and second terminals for connection to a source of A.C., an output circuit including a pair of terminals for connection to a load, said pair of terminals consisting of said second terminal and a third terminal, first and second parallel but oppositely poled controlled switching paths connected across said first and third terminals, third and fourth parallel but oppositely poled controlled switching paths connected across said second and third terminals, each of said switching paths being operable to conduct in response to a control signal applied thereto, said first and third switching paths being oppositely poled, and control means connected to said switching paths and operable in first and second modes for selectively controlling the conduction times of said paths to supply power to said output circuit in one or the opposite direction as desired, said control means in the first mode supplying control signals to said first and third paths to render the first path conductive at an instant of every other half cycle of said A.C., and said third path conductive at an instant of the intervening half cycles of said A.C., said control means in the second mode supplying control signals to said second and fourth paths to render the second path conductive at an instant of said intervening half cycles, and said fourth path conductive at an instant of said every other half cycles.

2. The combination of claim 1 wherein said control means is adjustable to vary the instant at which at least one of said first and third paths is rendered conductive while the control means is in said first mode, and to vary the instant at which at least one of said second and fourth paths is rendered conductive while the control means is in said second mode.

3. The combination of claim 1 wherein each of said switching paths comprises controlled rectifier means.

4. The combination of claim 3 wherein said controlled rectifier means comprises solid state controlled rectifier means.

5. The combination of claim 1 wherein said control means comprises transformer means having input means and output means, said transformer means being adjustable to vary the phase angle between its output and its input, adjustment means coupled to said transformer means and operable in opposite directions to vary said phase angle in opposite directions, means coupled to said input means for supplying thereto cyclic power having a predetermined phase relation with A.C. supplied to said power input circuit, said transformer means being operable in a first mode wherein operation of said adjustment means in a particular direction decreases said phase angle, said transformer means being operable in a second mode wherein operation of said adjustment means in said particular direction increases said phase angle, first signal providing means operative when connected to said output means to provide control signals to said first and third switching paths, second signal providing means operative when connected to said output means to provide control signals to said second and fourth switching paths, and transfer means selectively operable in either of first and second modes, in its first mode said transfer means connecting said output means to said first signal providing means and concurrently effecting operation of said transformer means in its first mode, in its second mode said transfer means selectively operable in either of first and second signal providing means and concurrently effecting operation of said transformer means in its second mode.

6. The combination as in claim 5 and further including common operator means coupled to said adjustment means and said transfer means for concurrently operating said adjustment means and said transfer means, to vary said phase angle while maintaining said transfer means in either of its modes.

7. The combination of claim 1 wherein said control means is so arranged that the respective instants at which said first and third paths are rendered conductive are 180° apart, and the respective instants at which said second and fourth paths are rendered conductive are 180° apart.

8. The combination of claim 3 wherein said control means is adjustable to vary said instants at which the paths are rendered conductive.

9. In a system for supplying reversible D.C. to a reactive load from an A.C. source, first and second parallel connected oppositely poled controlled asymmetric switching means connected in series with said A.C. source and said load, third and fourth parallel connected oppositely poled controlled asymmetric switching means connected across said load, said first and fourth switching means being poled alike, said first and third switching means forming a first control pair for one direction of current through the load, said second and fourth switching means forming a second control pair for the opposite direction of current through the load, and control means selectively operable in first and second modes for applying control signals to gate the respective switch means of either one or the other of said control pairs, as desired, said control means in one mode providing control signals to sequentially gate said first and third switch means during alternate half cycles of said A.C., said control means in the other mode providing control signals to sequentially gate said second and third switch means during alternate half cycles of said A.C.

10. The combination of claim 9 wherein each of said switch means comprises controlled rectifier means.

11. Apparatus for providing control signals comprising transformer means having input means and output means, said transformer means being adjustable to vary the phase angle between its output and its input, adjustment means coupled to said transformer means and operable in opposite directions to vary said phase angle in opposite directions, said transformer means being operable in a first mode wherein operation of said adjustment means in a particular direction decreases said phase angle, said transformer means being operable in a second mode wherein operation of said adjustment means in said particular direction increases said phase angle, first signal providing means operative when connected to said output means to provide output signals, second signal providing means operative when connected to said output means to provide output signals, and transfer means selectively operable in either of first and second modes, in its first mode said transfer means connecting said output means to said first signal providing means and concurrently effecting operation of said transformer means in its first mode, in its second mode said transfer means connecting said output means to said second signal providing means and concurrently effecting operation of said transformer means in its second mode.

12. Apparatus for providing control signals comprising transformer means having input means and output means, said transformer means being adjustable to vary the phase angle between its output and its input, adjustment means coupled to said transformer means and operable in opposite directions to vary said phase angle in opposite directions, said transformer means being operable in a first mode wherein operation of said adjustment means in a particular direction decreases said phase angle, said transformer means being operable in a second mode wherein operation of said adjustment means in said particular direction increases said phase angle, first signal providing means operative when connected to said output means to provide output signals, second signal providing means operative when connected to said output means to provide output signals, transfer means selectively operable in either of first and second modes, in its first mode said transfer means connecting said output means to said first signal providing means and concurrently effecting operation of said transformer means in its first mode, in its second mode said transfer means connecting said output means to said second signal providing means and concurrently effecting operation of said transformer means in its second mode, and common operator means coupled to said adjustment means and said transfer means for concurrently operating said adjustment means and said transfer means, to vary said phase angle while maintaining said transfer means in either of its modes.

13. The combination as in claim 11 and further including first and second controllable switching elements respectively responsive to said first and second signal providing means.

14. The combination as in claim 11 wherein said transformer means includes relatively movable elements whose positional relation is adjustable to vary the phase angle between output and input of the transformer means, and wherein said adjustment means coupled to said transformer means is for adjusting said positional relation.

15. The combination as in claim 11 wherein said transfer means is a switching arrangement which reverses a winding in said transformer means while concurrently switching said output means from one to the other of said signal providing means.

16. The combination as in claim 14 wherein said transfer means is a switching arrangement which reverses a winding in said transformer means while concurrently switching said output means from one to the other of said signal providing means.

17. The combination as in claim 16 and further including common operator means coupled to said adjustment means and said transfer means for concurrently operating said adjustment means and said transfer means, to vary said phase angle while maintaining said transfer means in either of its modes.

18. The combination as in claim 12 and further including first and second controllable switching elements respectively responsive to said first and second signal providing means.

References Cited

UNITED STATES PATENTS

| | | | |
|---|---|---|---|
| 2,720,621 | 10/1955 | Shrider et al. | 318—356 XR |
| 2,926,295 | 2/1960 | Allen | 318—356 XR |
| 3,184,670 | 5/1965 | Reynolds | 318—356 XR |
| 3,209,227 | 9/1965 | Berman et al. | 318—257 |
| 3,219,908 | 1/1965 | Zarleng | 321—45 |
| 3,325,715 | 6/1967 | Jacoby | 318—293 |
| 3,344,331 | 9/1967 | Adler et al. | 318—294 |

LEE T. HIX, *Primary Examiner.*

W. M. SHOOP, *Assistant Examiner.*

U.S. Cl. X.R.

318—300, 356